United States Patent [19]

Berry

[11] Patent Number: 5,227,080
[45] Date of Patent: Jul. 13, 1993

[54] INTRINSICALLY LUBRICATED MATERIAL COMPOSITIONS AND PRODUCTS THEREOF

[75] Inventor: Johnny D. Berry, Duncanville, Tex.

[73] Assignee: Integral Corporation, Carrolloton, Ga.

[21] Appl. No.: 594,938

[22] Filed: Oct. 10, 1990

[51] Int. Cl.$^5$ .......................................... C10M 103/00
[52] U.S. Cl. ..................................... 252/11; 524/907; 524/908; 138/105
[58] Field of Search ................... 252/11; 524/907, 908; 138/105

[56] References Cited

U.S. PATENT DOCUMENTS 5,036,210  7/1991  Goodman .......................... 138/105

Primary Examiner—Ellen McAvoy

[57] ABSTRACT

A conduit formed of extruded polymeric material, which outer surfaces are continuously intrinsically lubricated by a reserve of active lubricious agents which migrate outwardly from within the composition to such surfaces.

5 Claims, 1 Drawing Sheet

INTRINSICALLY LUBRICATED MATERIAL COMPOSITIONS AND PRODUCTS THEREOF

FIELD OF THE INVENTION

This invention relates to prelubricated polymeric compositions, more particularly to structures formed of material providing continuous surface lubricity, and even more particularly to conduits formed of such material.

BACKGROUND OF THE INVENTION

There are many applications where an effective lubricious material composition is required in order to facilitate the movement of one member with respect to another. For example, and of particular relevance to the present invention, power and communication applications require the rapid and effective installation of power and communication cables through miles of underground conduits and ducts. To meet the demand for rapid installations of the cables, it is necessary that the interface between the cable and surrounding conduit or duct be sufficiently lubricious to sufficiently reduce the coefficient of friction therebetween.

BACKGROUND OF THE PRIOR ART

While various solutions have been proposed for providing the required lubricity, these solutions have generally not been entirely satisfactory for all conditions of service.

For example, it is known to form a prelubricated duct or conduit with a co-extruded surface layer in which lubricating additives are impregnated. Unfortunately, the benefits are limited due to the very small quantity of lubricious agents that can effectively be embedded within the surface layer, largely due to solubility problems associated with the mixing of nonsimilar materials. As a result, only small amounts of these lubricious agents are present at the surface where they are needed, and the constant sliding of the cable along this surface soon exhausts that initial quantity of lubricious material that was available.

It is also known to use water soluble type lubricants at the interface of cable and duct in order to lower the coefficient of friction at such interface. However, in the case of these water soluble lubricants, particularly ones such as glycols, polyglycols or glycerine, their effectiveness is limited by the wetting, or even flooding of the innerbore of the buried conduit, by ground water penetration. Under such environmental conditions, the water soluble lubricant is simply washed out of the innerbore and therefore becomes unavailable.

Friction problems have also been addressed by providing longitudinal ribs or ridges at the conduit surface for the purpose of reducing the pulling resistance by reducing the surface contact area between the conduit and the cable. Reliance upon such longitudinal ribs, however, has been misplaced which actually serve to enhance, rather than solve, the problem.

OBJECTS OF THE INVENTION

It is therefore the principal object of the invention to provide new and improved compositions offering superior lubricity.

It is a further object of the present invention to provide such a composition for the fabrication of cable conduits, ducts and the like.

It is another object of the invention to provide cable conduits and innerducts of such material composition in order to provide a vastly smoother or mirror surface for reduction of friction.

It is a still further object of the invention to achieve the previous objects with a material that replenishes the lubricity of the surface following a previous frictional encounter.

It is a still further object of this invention to achieve the previous objects in an economical manner and to enhance the market competitiveness of products formed of such compositions.

SUMMARY OF THE INVENTION

In accordance with the aforelisted and other objects, the present invention is directed to an intrinsically lubricated material composition which has self-regenerating surface lubricity. In accordance with the invention, such composition is employed for fabrication of cable conduits and innerduct assemblies. In practical application, this intrinsic lubrication affords a distinct advantage since it is often difficult to predict during manufacture whether or not any given conduit may ultimately be used as an innerduct, i.e. a conduit which will be pulled through a preexisting conduit, or as the conduit through which the cable extends. The conduit structures thus formed by the composition of the invention are intrinsically lubricated throughout their entire cross-section with the consequent result being that both the outer and inner surfaces of such conduits are sufficiently lubricious.

In accordance with a particular feature, the conduit or innerduct is formed of a polymeric composition in which an excess or reserve quantity of active lubricious agents are held in suspension throughout the composition. Upon the removal of the lubricious agents from the surface areas of such composition, as for example by the wearing or frictional contact of the cable, the reserve agents within the composition migrate to the surface, thereby replenishing and restoring surface lubricity. The result is long term availability of highly lubricated surfaces for the ducts and conduits, thus facilitating cable movement within a duct and innerduct movement through a conduit.

Specific and additional features of the invention, as well as additional objects and advantages thereof, will become readily appreciated by those skilled in the art from the following detailed description, taken in conjunction with the accompanying drawings.

DESCRIPTION OF THE PREFERRED EMBODIMENT

Figure 1:
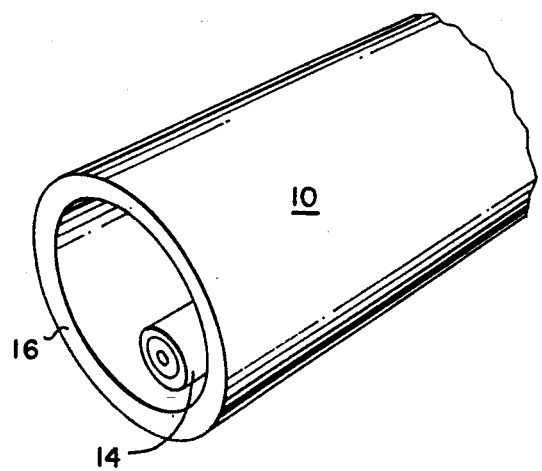
FIG. 1 is a perspective view of a conduit through which a cable, for example, has been drawn, the conduit having been formed from the polymeric composition of the present invention.

In the description which follows, like parts are designated throughout the specification and drawings with the same reference numerals, respectively. The drawing figures are not necessarily to scale, and in certain views portions have been exaggerated for purposes of clarity.

Referring initially to FIG. 1 of the drawings, a conduit 10 is illustrated through which a cable 14 extends and is encased. It is to be understood that the cable 14 may be of any type known in the art, particularly those used for power or communication transmission, as telephone cables, broadband CATV cables, fiber optic cables, and the like.

Figure 2:
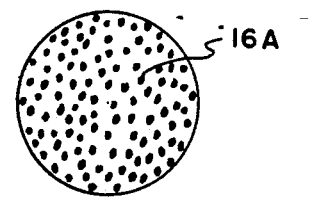
FIG. 2 is an enlarged view of a portion of the end of the conduit wall of FIG. 1 showing the suspended lubricious agents throughout the polymeric material.

In accordance with the present invention, the conduit 10 is produced by the extrusion of polymeric material using conventional and known monoextrusion techniques. Throughout the extended conduit wall 16, and as illustrated in FIG. 2, is an abundant concentration or suspension of lubricious agents 16A randomly scattered throughout the conduit. These lubricious agents are of the type that, upon their depletion from the surface areas of the conduit, migrate to such surfaces to replenish and restore surface lubricity. The active ingredients of these agents may be, for example, alkoxylated sorbitols, ethylene-bis stearamides, high molecular weight polyethylene glycols, high molecular weight methoxy polyethylene glycols, dimethyl siloxane polymers, dimethylsiloxane/amine copolymers, various salts of stearic acid or of other fatty acids such as zinc, calcium, magnesium, barium, or amides such as stearamides, or low molecular weight halocarbons between $C_{18}$ and $C_{30}$ carbon numbers.

Figure 3:
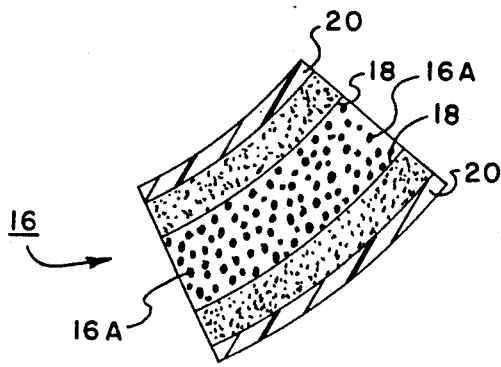
FIG. 3 is an enlarged partial sectional view of the wall of the conduit of FIG. 1, illustrating the adjacent lubricious boundary layers, smooth mirror-like inner and outer surfaces, and the lubricious agent zone or reserve.

As a consequence of this formation, and as illustrated in FIG. 3, the conduit wall is composed of a central zone 17 having a reservoir of lubricious agents 16A and boundary layers 18 into which the agents 16A migrate as they are depleted from outer conduit surfaces 20, thus resulting in continuously lubricious outer surfaces, and consequent reduction in coefficient of friction. The result is a conduit formed of an intrinsically lubricated polymer composition with self-regenerating surface lubricity.

The intrinsically lubricated composition constitutes a substrate of very high surface area in which relatively large quantities of the selected lubricious agents are absorbed. Such substrates should be of materials having the capacity to absorb many times their weight and may be, for example, of diatomaceous earth (diamite), fumed silica, silica gel, or high surface area carbon blacks.

As previously described, the porous absorbing substrate functions to absorb large quantities of the lubricious agents. This is achieved by placing the appropriate amount of absorbing substrate into a high intensity mixer and, during the mixing stage, adding solubility control or coupling agents to the substrate material. Subsequently, the combined mixture is heated to at least 100 degrees Celsius and devolatized to remove any moisture (water) or alcohols (hydrolyzable groups) which may be present. Next, the lubricating (lubricious) agents material is slowly added, while mixing, until such is totally absorbed into the substrate material.

The coupling agents control the solubility of the lubricating agents, therefore controlling the eventual rate of lubricant agent migration to the surfaces. Preferred coupling agents are of the titanium organometallic types such as monoalkoxy or neo-titanates and can be, for example, isopropyl alkoxy trisostearoyl titinates, isopropyl dimethacryl isostearoyl titinate (for cross linking systems), or tetra (2, diallyoxymetlyl-1 butoxy titanium di (di-tridecyl) phosphite (for plastisol mixtures).

The preferable composition, by weight, is as follows:

|  | By Weight |
| --- | --- |
| Porous absorbing substrate | 10–20% |
| Lubricious agents | 40–80% |
| Solubility control or coupling agents | 0.5–5.0% |

Figure 4:
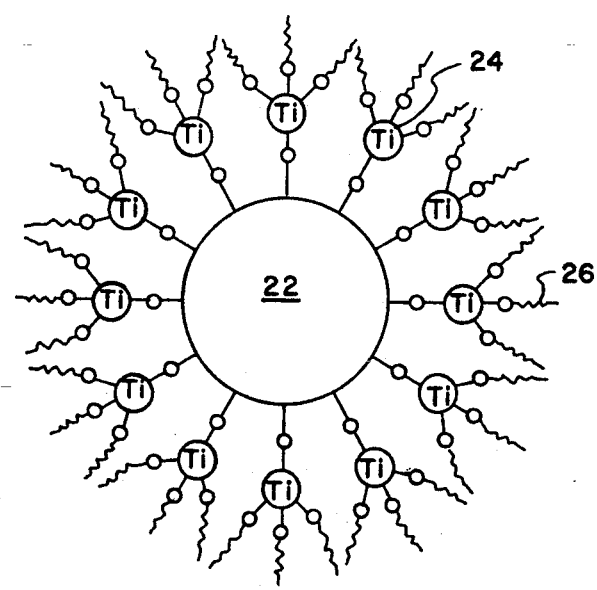
FIG. 4 is a schematic or diagrammatic illustration of the relationship between the coupling agents and absorbing substrate of the composition of the present invention.

The chemical make up such a composition is diagrammatically illustrated by FIG. 4. The porous absorbing substrate (represented by numeral 22) which contains a relatively large quantity of the lubricating (lubricious) agents is held soluble by the surface reacting titinate coupling agent (represented by 24). The latter is selected by the type of attached ligand coupling agent 26 to the central titinate atom to provide van der Waal entanglement. This serves to improve polymer compatibility and effect an unsaturated carbon-carbon bond to provide an available site for cross-linking into a polymer backbone, or plastisol solubility in PVC systems, depending on the preferred polymer of conduit manufacture. Furthermore, after the proper mixture of the aforementioned agents are prepared, they may be compounded (melt mixed) into a suitable polymer in high concentration to provide ease of blending by conventional polymer techniques.

The amount of lubricating material, polymeric solubility, and rate of migration (and therefore regeneration rate) may be controlled by varying the surface area of the absorbing substrate, the molecular weight (volatility) of the lubricating agent material, and the nature and quantity of coupling control agents.

By way of example, and in accordance with a preferred method, the composition of the conduit 10 is formed with a lubricating agent material comprised of ethylene-bis stearamide in an amount of about eighty percent (80%) by weight with a substrate of diatomaceous earth having a surface area of about 50–250 square meters per gram. When used with a solubility control agent of isopropyl alkoxy trisostearoyl titinate, the foregoing will produce a continuous migration of lubricious agents at a rate of about 4 grams per 1,000 feet per month. This results in conduit surfaces sufficiently wet with lubricant so as to afford a coefficient of friction of about 0.1. Should the conduit surface be wiped clean by the moving cable 14, the conduit surface will incur a regeneration of wet lubricant within about twenty-four (24) hours. Regeneration in this manner will effectively continue for about 72 months.

Where it is desired to increase the regeneration rate, it can be achieved by varying the lubricating agent from ethylene bis stearamide to stearamide. Similarly, the regeneration rate can be decreased by varying the lubricating agent from stearamide to dimethylsiloxane/amine. Either of the foregoing variances will cause a correlated change in the rate of lubricant migration along with a correlated change in life expectancy of the intrinsic surface lubrication before supplemental lubrication becomes necessary.

By the above description, there is disclosed a novel material composition and product application, affording intrinsically lubricated surface portions. Being intrinsically wetted with a lubricant liquid, as described, substantially enhances the life and performance ability of products utilizing such composition. The virtues are many, including continuous surface lubrication over elongated surface lengths that, in turn, translates into lower draw forces and reduced averse effects of friction. Whereas the invention has been described principally in terms of conduits or ducts, it should be readily apparent that its utilization extends to any application where high friction forces between engaging surfaces are sought to be reduced.

Various modifications to the aforementioned description may become readily apparent without departing from the spirit and scope of the invention, as solely defined by the appended claims.

What is claimed is:

1. A polymeric composition containing a suspension of lubricious material within a zone having a significantly higher concentration of said lubricious material than that in the areas adjacent said zone that continuously migrates from said zone to the surface of said composition, thereby to continuously replenish lubricious material removed from said surface.

2. The polymeric composition in accordance with claim 1, wherein said lubricious material is selected from the group consisting of alkoxylated sorbitols, ethylene-bis-stearamides, polyethylene glycols, dimethyl siloxane polymers, salts of stearic acids, fatty acids, and halocarbon oils between $C_{18}$ and $C_{30}$ carbon numbers.

3. The polymeric composition in accordance with claim 2 comprising a substrate selected from the group consisting of diatomaceous earth, fumed silica, and carbon blacks.

4. A conduit, having an outer and inner wall, for receiving lengths of cable to be drawn through said conduit, said conduit being comprised of a polymeric composition containing a suspension of lubricious material within a zone having a significantly higher concentration of said lubricious material than that in the areas adjacent said zone that continuously migrates from said zone to the outer and inner wall of said conduit, whereby when the lubricious material is removed from the said walls, the lubricity of said walls are continuously replenished.

5. The conduit as set out in claim 4 wherein said lubricious material is selected from the group consisting of alkoxylated sorbitols, ethylene-bis-stearamide, polyethylene glycols, dimethyl siloxane polymers, salts of stearic acids, fatty acids, and halocarbons oils between $C_{18}$ and $C_{30}$ carbon numbers.

* * * * *